US012018820B2

(12) United States Patent
Gasparin et al.

(10) Patent No.: US 12,018,820 B2
(45) Date of Patent: Jun. 25, 2024

(54) TOOLLESS SNAP-FIT ADAPTOR MODULE FOR INTEGRATING SPOT HEAD LUMINAIRES

(71) Applicant: SIGNIFY HOLDING B.V., Eindhoven (NL)

(72) Inventors: Szabolcs Gasparin, Salgótarján (HU); Soma Gabor Ungar, Budapest (HU)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/034,924

(22) PCT Filed: Oct. 26, 2021

(86) PCT No.: PCT/EP2021/079656

§ 371 (c)(1), (2) Date: May 2, 2023

(87) PCT Pub. No.: WO2022/096320

PCT Pub. Date: May 12, 2022

(65) Prior Publication Data

US 2024/0011624 A1 Jan. 11, 2024

(30) Foreign Application Priority Data

Nov. 3, 2020 (EP) .................................... 20205331
Mar. 30, 2021 (EP) .................................... 21165796

(51) Int. Cl.
*F21V 17/16* (2006.01)
*F21S 8/04* (2006.01)
*F21V 21/02* (2006.01)

(52) U.S. Cl.
CPC ............. *F21V 17/164* (2013.01); *F21S 8/04* (2013.01); *F21V 21/025* (2013.01)

(58) Field of Classification Search
CPC .............................. F21S 8/066; F21V 21/025
See application file for complete search history.

(56) References Cited

U.S. PATENT DOCUMENTS 4,118,760 A * 10/1978 Cohon .................... F21S 8/033 362/258
9,618,172 B1 * 4/2017 Means, III .............. F21V 21/30
(Continued)

FOREIGN PATENT DOCUMENTS

CN 111734994 A 10/2020
DE 3244516 A1 * 6/1984 .............. F21V 21/02
(Continued)

*Primary Examiner* — Alexander K Garlen

(57) ABSTRACT

This invention relates to a modular and removable integration technique for a luminaire (100) on an adaptor plate (201) with a general area lighting rail system (202). The luminaire (100) comprises, a mounting system (200), a lighting device (300), and a mounting device (400). The mounting system (200) comprises an adaptor plate (201) that can be attached to a rail system (202). The lighting device (300) comprises a shaft (301) that is 5 configured to have a lamp (302) on a first end and a flange (303) on a second end. The mounting device (400) comprises at least a pair of interface plugs (401, 402). The pair of interface plugs (401, 402) is configured to be attached together to form an inner perimeter (403) around a hollow space and the inner perimeter (403) can embrace the second end of the shaft (301) that is received through an opening (203) of the adaptor plate (201). The inner 10 perimeter (403) is substantially the same or larger than an outer perimeter of the shaft, but smaller than the flange (303). The opening (203) of the adaptor plater (201) is bigger than the flange (303), and smaller than the mounting device (400) when the pair of the interface plugs (401, 402) are attached together.

13 Claims, 6 Drawing Sheets

(56) References Cited

U.S. PATENT DOCUMENTS

| | | | | | |
|---|---|---|---|---|---|
| 2004/0196666 | A1* | 10/2004 | Bina | F21V 19/02 | |
| | | | | 362/581 | |
| 2011/0228544 | A1* | 9/2011 | Dubord | F21V 19/001 | |
| | | | | 29/592.1 | |
| 2014/0328055 | A1* | 11/2014 | Maxik | F21V 29/767 | |
| | | | | 362/218 | |
| 2018/0249559 | A1* | 8/2018 | Sakurai | F21V 21/30 | |

FOREIGN PATENT DOCUMENTS

| | | | | |
|---|---|---|---|---|
| DE | 29812354 | U1 | 10/1998 | |
| DE | 202010009487 | U1 | 10/2010 | |
| DE | 202012101249 | U1 * | 7/2013 | F21S 8/063 |
| DE | 102019000410 | A1 * | 7/2020 | F21S 8/066 |
| EP | 3327343 | A2 | 5/2018 | |
| EP | 3686488 | A1 | 7/2020 | |
| WO | 2018069097 | A1 | 4/2018 | |

* cited by examiner

TOOLLESS SNAP-FIT ADAPTOR MODULE FOR INTEGRATING SPOT HEAD LUMINAIRES

CROSS-REFERENCE TO PRIOR APPLICATIONS

This application is the U.S. National Phase application under 35 U.S.C. § 371 of International Application No. PCT/EP2021/079656, filed on Oct. 26, 2021, which claims the benefit of European Patent Application No. 20205331.0, filed on Nov. 3, 2020 and European Patent Application No. 21165796.0, filed on Mar. 30, 2021. These applications are hereby incorporated by reference herein.

FIELD OF INVENTION

This invention relates to a modular and removable mounting technique for a luminaire on a mounting system associated with an adaptor plate attached to a general area lighting rail system.

BACKGROUND OF THE INVENTION

Spot head luminaires or projector luminaires or spotlights have highly relevant applications in retail shops, entertainment, and gallery exhibition, to name a few. Quite often these types of luminaires are installed on the ceiling by means of a rail system. After installation, the direction of illumination may be changed as desired.

SUMMARY OF THE INVENTION

If a commissioner would like to install a spothead or spot light or projector luminaires, he would need to install a rail system or a track system on the ceiling and mount such a lighting device with the rail system or the track system. Mounting may require few interfacing components for fixing the lighting device with the track or rail system by means of few screws. This is disadvantageous the lighting device may become fixed to the rail by screws. Therefore this solution makes the installation difficult and also makes the on-site servicing difficult. As a result, an alternative solution for the mounting of spot head luminaires is needed that is also flexible enough to allow easy repair or rearrangement.

It is therefore an object of the present invention to provide an innovative mounting solution to mount the spot head luminaires directly onto the general area lightning rail or track system in a modular fashion that requires only a few components and easily attachable or detachable without the need of screws. At the same time, ensuring the robustness of the arrangement.

According to a first aspect of the invention, a luminaire is provided. The luminaire comprises, a mounting system, a lighting device, and a mounting device. The mounting system comprises an adaptor plate that can be attached to a rail system. The lighting device comprising a shaft having a flange on a second end and configured to have a lamp on a first end. The mounting device comprises at least a pair of interface plugs. The pair of interface plugs are configured to be attached together to form an inner perimeter around a hollow space and the inner perimeter can embrace the second end of the shaft that is received through an opening of the adaptor plate. The inner perimeter is substantially the same or larger than an outer perimeter of the shaft, but smaller than the flange. The opening of the adaptor plater is bigger than the flange, and smaller than the mounting device when the pair of the interface plugs are attached together.

The adaptor plate has one or more openings or cutouts through which the shaft of the lighting device can be pulled into the adaptor plate.

The pair of interface plugs may comprise a slot in the form of a hollow space for at least embracing the shaft. The pair of interface plugs may hold onto the shaft by means of friction.

The pair of interface plugs can be pushed together onto the shaft and/or around the flange of the shaft. The interface plugs, therefore, extend onto the flange providing lateral support across the adaptor plate axis for securing the lighting device without falling out through the opening. Therefore, this pair of interface plugs act as the mounting structure.

The pair of interface plugs may have complementary pin and slot features for easy alignment and attachment. The attachment may be based on friction.

Alternatively, the pair of interface plugs may be configured to be attached together by means of snap fitting.

The mounting device with the pair of interface plugs may be attached together has a rectangular or a square shape.

The mounting device may comprise more than two interface plugs that can be attached together to form a unibody.

The adaptor plate may comprise a number of trunking profiles.

The adaptor plate may have a first trunking profile configured to secure the mounting device with the adaptor plate by snap-fitting. The pair of interface plugs attached together by means of pin and slot may not have a strong fixation. The attached interface plugs along with the lighting device may be pushed down into the adaptor plate first trunking profile and snap fitted into the adaptor plate which guarantees no orthogonal movement with respect to the adapter plate. When the interface plugs are snap fitted together, they may form a rectangular or square shape on the periphery. So when the pair of interface plugs are secured within the adaptor plate, they may be tightly locked or secured with potentially no room for rotational or lateral movement.

The adaptor plate may have a recessed profile around the opening to at least partially accommodate the mounting device.

The recessed profile may have a similar shape as the mounting device.

This may be considered as an additional or alternative measure for strongly attaching the pair of interface plugs together and securing the mounting device with the adaptor plate with potentially no room for rotational movement.

The pair of the interface plugs may have a partial extension through the opening of the adaptor plate.

The interface plugs may also have a protruding profile that extends through one or more openings or cutouts of the adaptor plate. This protruding profile may also have the same shape as the adaptor plate openings or cutouts for ensuring that there is no rotational movement of the interface plugs once the lighting device is secured with the adaptor plate.

The adaptor plate may have a second trunking profile configured to secure a driver of the lighting device with the adaptor plate by snap-fitting.

Alternatively, the adaptor plate may have a second trunking profile configured to secure a driver of the lighting device with the adaptor plate by double-sided tape.

The adaptor plate may have a third trunking profile configured to secure the adaptor plate with the rail system by snap-fitting.

The adaptor plate may have a fourth trunking profile configured to secure a cable holder with the adaptor plate by snap-fitting.

The adaptor plate may have several trunking profiles suitable for easy attachment with the rail or track system, the mounting device, and several other luminaire components by means of the snap fitting. The adaptor plate with a snap-fit profile for the interface plugs and the driver (other electronics components) is also part of the invention. The commissioner or the installer can assemble and mount the lighting device onto the rail system in a way that does not require tools such as a screwdriver, but by utilizing the flexibility of the suspended rail and utilizing the flexibility of the adaptor plate profile that allows snap-fitting of modular components.

The luminaire may comprise a safety cord and one end of the safety cord may be configured to be attached to the rail system and another end of the safety cord may have a hook that may be configured to be snap-fitted with one of the pair of interface plugs.

The safety cord may be fixed to the rail system by a rivet.

The safety cord ensures the safety of the mounting system such that the lighting device does not accidentally fall if the attachment between the adaptor plate and the rail system fails.

It should be noted that the invention relates to all possible combinations of features recited in the claims. Other objectives, features, and advantages of the present inventive concept will appear from the following detailed disclosure, from the attached claims as well as from the drawings. A feature described in relation to one of the aspects may also be incorporated in the other aspect, and the advantage of the feature is applicable to all aspects in which it is incorporated.

BRIEF DESCRIPTION OF THE DRAWINGS

Embodiments of the invention as well as additional objects, features and advantages of the disclosed devices, methods, and systems, will be better understood through the following illustrative and non-limiting detailed description of embodiments of devices, methods, and systems, with reference to the accompanying schematic drawings in which corresponding reference symbols indicate corresponding parts, and in which.

All the figures are schematic, not necessarily to scale, and generally only show parts which are necessary in order to elucidate the invention, wherein other parts may be omitted or merely suggested.

DETAILED DESCRIPTION OF THE EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
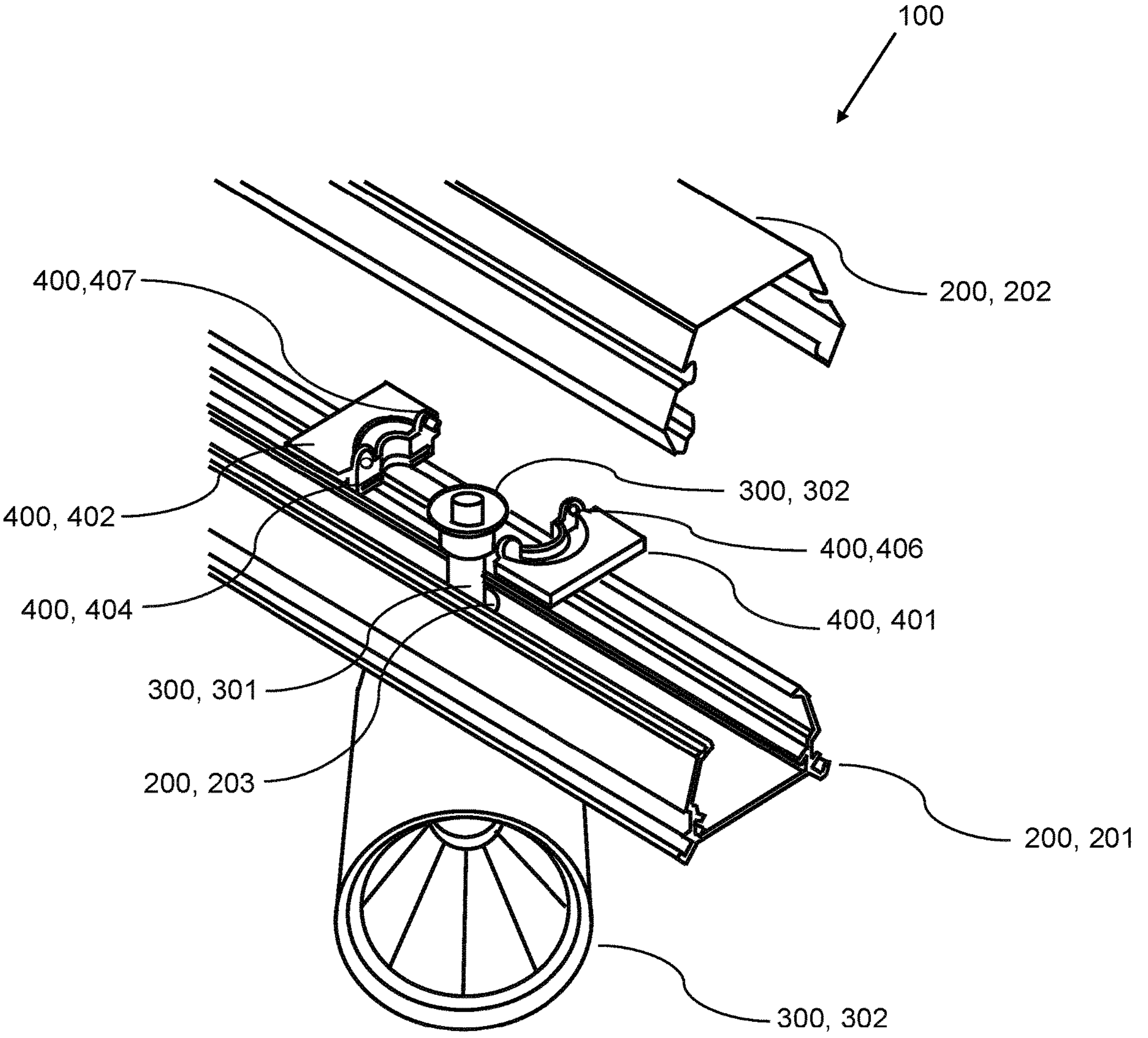
FIG. 1 (*a*) and (*b*) show exploded views of a luminaire.
Figure 1B:
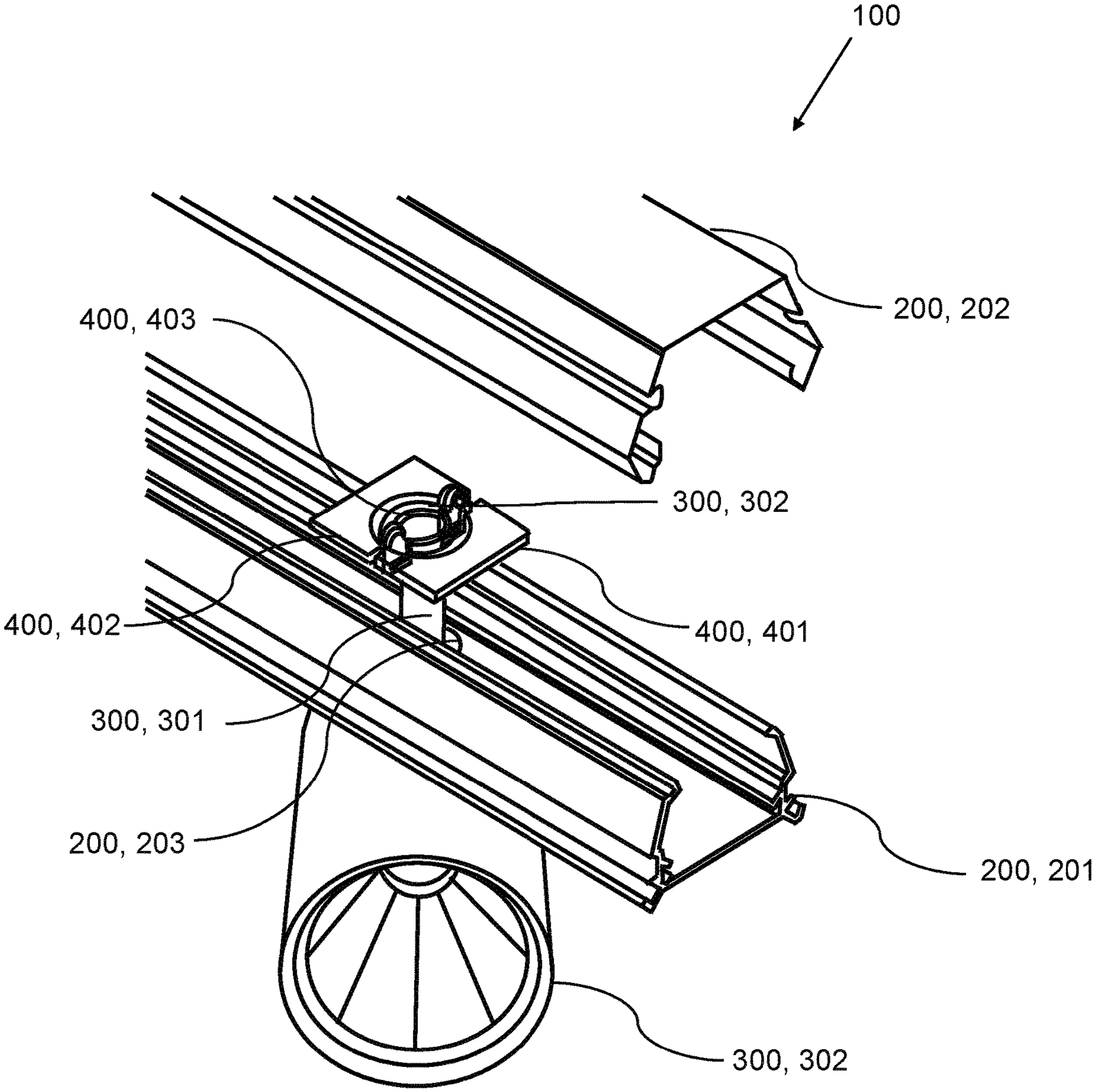

FIGS. 1(*a*) and (*b*) show exploded views of a luminaire 100 where a pair of interface plugs 401 and 402 are being assembled together with a flange 302 of a lighting device 300 and is mounted from an adaptor profile 201.

The luminaire 100 comprises a mounting system 200 comprising an adaptor plate 201 that is attachable with a rail system 202. The rail system 202 is attached or suspended from a surface, perhaps a ceiling surface. As shown in FIG. 1(*a*), adaptor place 201 and the rail system 202 have complementary trunking profiles that allow easy snap-fitting attachment.

The lighting device 300 comprises a shaft 301. On a first end of the shaft 301, a lamp 302 is attached. And on a second end, a flange 303 is protruding orthogonal to the shaft 301. A suitable example of the light device 300 can be a spot head, a spotlight, or projector luminaire. The shaft 301 may have a hollow core and necessary electrical lines for the lamp 302 can be pass through the shaft 301. The adaptor plate 201 has an opening or cutout 203 and the second end of the shaft 301 is pulled through the opening 203.

In FIG. 1(*b*), it is shown that when the pair of interface plugs 401, 402 can be attached together to form an inner perimeter 403 around a hollow space and the inner perimeter 403 can embrace the second end of the shaft 301 can be accommodated within this hollow space. The inner perimeter 403 is substantially the same or larger than an outer perimeter of the shaft, but smaller than the flange 303. The opening 203 of the adaptor plater 201 is bigger than the flange 303, and smaller than the mounting device 400 when the pair of the interface plugs 401, 402 are attached together. Hence, a greater protrusion for lateral support within the adaptor plate 201 is realized for mounting the lighting device 300.

Figure 2:
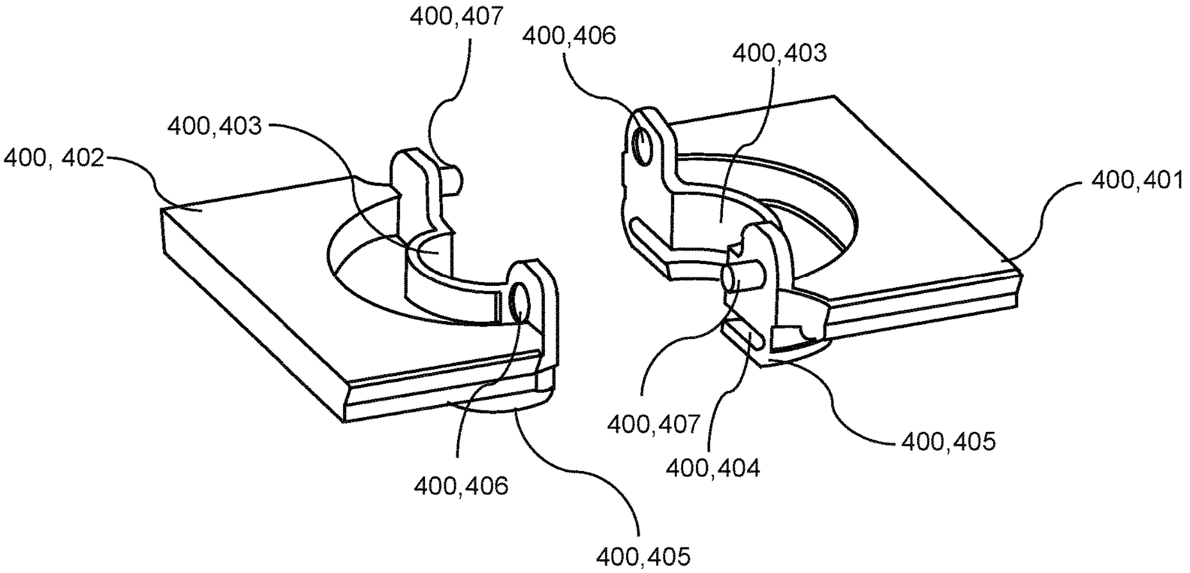
FIG. 2 shows a perspective view of the mounting device.

FIG. 2 shows a perspective view of the mounting device 400 from FIG. 1(*a*). The mounting device 400 comprising at least a pair of interface plugs 401, 402 are arranged around the flange 302 as shown in FIG. 1(*b*). As shown in FIGS. 1(*a*) and 2, the pair of interface plugs 401, 402 has a slot 404 within its solid body for accommodating the flange 303 of the shaft 301. Although one can assume that the pair of interface plugs 401, 402 can be arranged so that the flange 303 is located on a side of the pair of interface plugs 401 while the lamp 302 is located on the other side. In this case, one can imagine a friction-based engagement between the mounting device 400 and the shaft 301.

In FIG. 2 it is also shown that the pair of interface plugs 401 and 402 have complementary pin 406 and slot 407 features. Therefore, the pair of interface plugs 401 and 402 easily aligned with each other and attached together forming a square or rectangular body. The inner perimeter 403 of the pair of interface plugs 401 and 402 are shown to be circular. However, the inner perimeter may also below polygonal. The depth of the slot 404 should be enough to accommodate the flange 302 as shown in FIG. 1(*a*).

Figure 3:
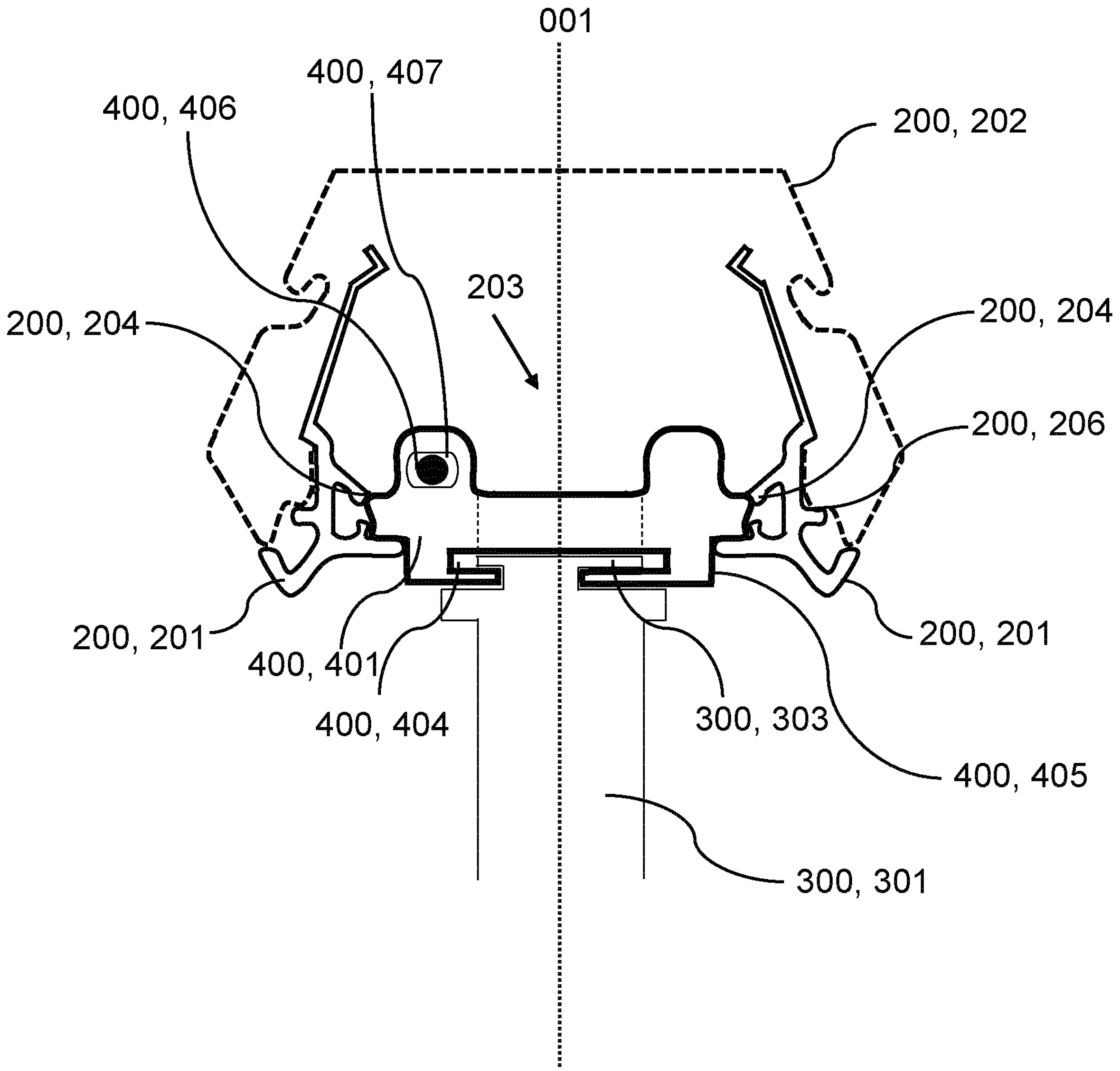
FIG. 3 shows a cross-sectional view of the pair of interface plugs and the adaptor plate assembled within the rail system.

FIG. 3 shows a cross-sectional view of the pair of interface plugs 401, 402 and the adaptor plate 201 assembled within the rail system 202.

The pair of interface plugs 401 and 402 may be secured together by snap-fitting with each other. Then the interface plugs 401 and 402 along with the lighting device 300 are pushed down into the adaptor plate 201 and a first trunking profile 204 configured to secure the mounting device 400 with the adaptor plate 201 by snap fitting. The mounting device 400 with the pair of interface plugs 401, 402 attached together has a square or rectangular shape. Therefore, when the mounting device 400 is secured with the adaptor plater 201 by snap fitting, there is no excess room for rotation around the shaft center axis 001. This provides stability of the mounting structure 400 against any axial rotation.

The mounting device 400 with the pair of interface plugs 401, 402 attached together may also have a rectangular shape. Importantly, the width between the first trunking profiles 204 of the adaptor plate 201 is substantially the same as the width of the mounting structure 400. Alternatively, the adaptor plate 201 may have a recessed profile around the opening 203 to at least partially accommodate the mounting device 400. The recessed profile can have a polygonal shape. In this case, the mounting device 400 may have a fitting shape with the recessed profile for avoiding axial rotation.

As shown in FIG. 3, one of the interface plugs 401 has a slot 404 for accommodating the flange 303 of the shaft 301. By the dashed lines it is indicated that the shaft 301 may extend within or through the mounting device 400.

The pair of the interface plugs 401, 402 has a partial extension 405 through the opening 203 of the adaptor plate 201. If the perimeter of the partial extension 405 matches well with the perimeter of the opening 203, the stability of the lighting device 300 can be further improved against axial rotating when a user is prompted to change the spotlight or spot head illumination direction.

The pair of interface plugs 401 and 402 may be complementary pin 406 and slot 407 features for easy alignment.

In FIGS. 1, 2, and 3, a combination of a mounting system 200 and a mounting device 400 is shown that allows easy mounting of a lamp 200 with snap-fitting components from the luminaire 100. Therefore, no special tools are needed for assembling this luminaire 100, nor it is difficult to change or repair the luminaire 100 when it is necessary.

Figure 4:
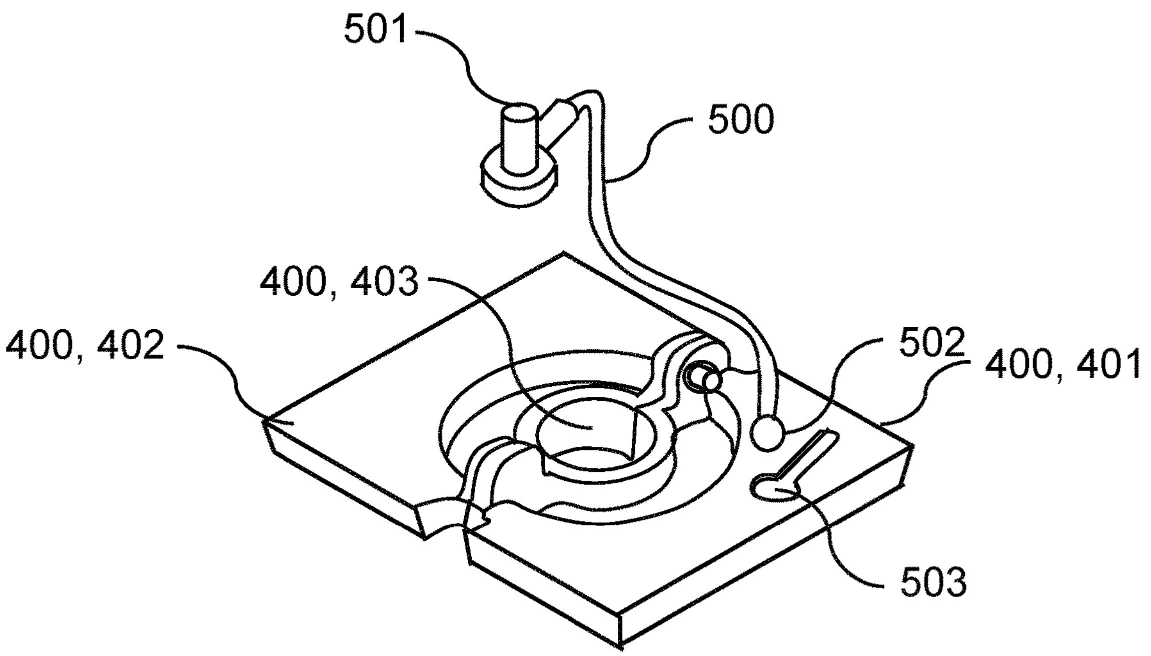
FIG. 4 shows a safety cord with the pair of interface plugs.

FIG. 4 shows a safety cord 500 with the mounting device 400 where the pair of interface plugs 401, 402 are attached together. In this figure, it is shown that when the pair of interface plugs 401, 402 can be attached together, an inner perimeter 403 with a circular shape is formed that is hollow.

One end of the safety cord 500 is configured to be attached to the rail system 202. This can be done by riveting. Another end of the safety cord 500 has a hook 502 that is configured to be snap-fitted with one of the pair of interface plugs 401, 402. This safety cord 500 ensures the safety of the mounting system such that the lighting device 300 does not accidentally fall if the attachment between the adaptor plate 201 and the rail system 202 fails.

Figure 5:
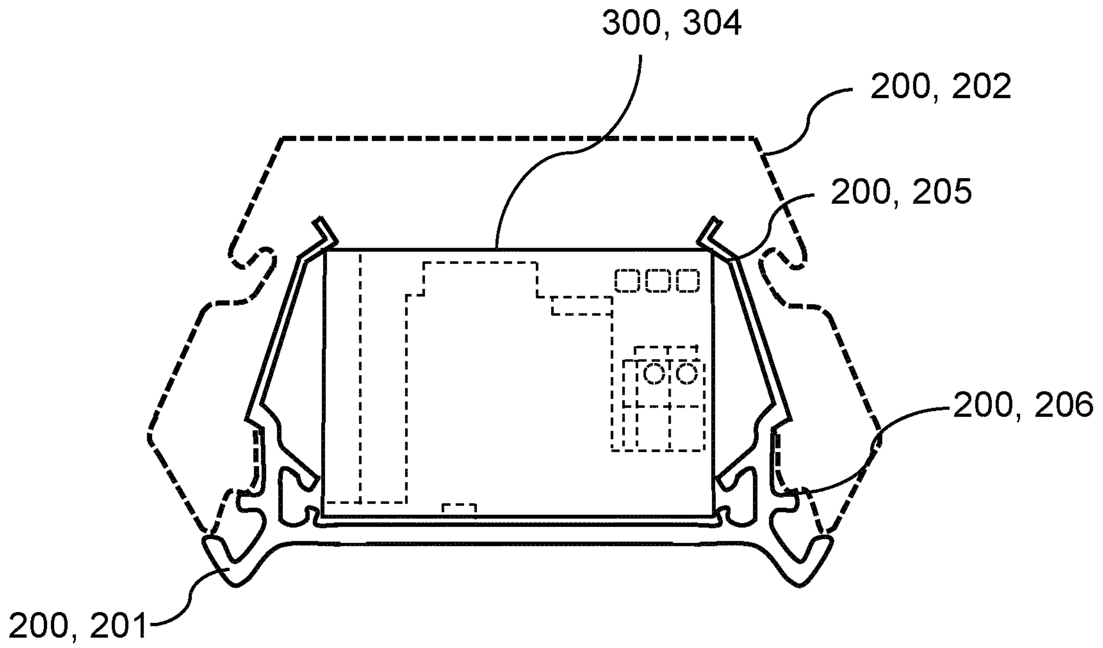
FIG. 5 shows a driver of a lighting device being assembled into the adaptor plate profile and being fixed by the snap-fit feature.

FIG. 5 shows a driver 304 of a lighting device 300 assembled into the adaptor plate 201 profile and being fixed by the snap-fit feature. The adaptor plate 201 has a second trunking profile 205 configured to secure a driver 304 of the lighting device with the adaptor plate by snap-fitting. The adaptor plate 201 has a third trunking profile 206 configured to secure the adaptor plate 201 with the rail system 202 by snap-fitting. The adaptor plate 201 may have a fourth trunking profile configured to secure a cable holder or other components with the adaptor plate 201 by snap-fitting.

However, one may also secure the driver of the lighting device on the adapter plate by means of double sided tapes.

Therefore, the adaptor plate 201 may have several trunking profiles suitable for easy attachment with the rail or track system, the mounting device, and several other luminaire components by means of the snap fitting.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements.

The mere fact that certain features are recited in mutually different dependent claims does not indicate that a combination of these features cannot be used to advantage. The various aspects discussed above can be combined in order to provide additional advantages. Further, the person skilled in the art will understand that two or more embodiments may be combined.

The invention claimed is:

1. A luminaire comprising:

a mounting system comprising an adaptor plate that can be attached to a rail system, a lighting device comprises a shaft having a flange on a second end and configured to have a lamp on a first end, and a mounting device comprising at least a pair of interface plugs, wherein the pair of interface plugs are configured to be attached together to form an inner perimeter around a hollow space and the inner perimeter can embrace the second end of the shaft that is received through an opening of the adaptor plate, wherein the inner perimeter is substantially the same or larger than an outer perimeter of the shaft, but smaller than the flange, and wherein the opening of the adaptor plater is bigger than the flange, and smaller than the mounting device when the pair of the interface plugs, are attached together.

2. The luminaire according to claim 1, wherein the pair of interface plugs comprise a slot for accommodating the flange of the shaft.

3. The luminaire according to claim 1, wherein the pair of interface plugs have complementary pin and slot features for easy alignment and attachment.

4. The luminaire according to claim 1, wherein the pair of interface plugs are configured to be attached together by means of snap fitting.

5. The luminaire according to claim 1, wherein the mounting device with the pair of interface plugs attached together has a rectangular or a square shape.

6. The luminaire according to claim 1, wherein the adaptor plate has a first trunking profile configured to secure the mounting device with the adaptor plate by snap-fitting.

7. The luminaire according to claim 1, wherein the adaptor plate has a recessed profile around the opening to at least partially accommodate the mounting device.

8. The luminaire according to claim 1, wherein the pair of the interface plugs have a partial extension through the opening of the adaptor plate.

9. The luminaire according to claim 1, wherein the adaptor plate has a second trunking profile configured to secure a driver of the lighting device with the adaptor plate by snap-fitting.

10. The luminaire according to claim 1, wherein the adaptor plate has a second trunking profile configured to secure a driver of the lighting device with the adaptor plate by double-sided tape.

11. The luminaire according to claim 1, wherein the adaptor plate has a third trunking profile configured to secure the adaptor plate with the rail system by snap-fitting.

12. The luminaire according to claim 1, wherein the adaptor plate has a fourth trunking profile configured to secure a cable holder with the adaptor plate by snap-fitting.

13. The luminaire according to claim 1, wherein the luminaire comprises a safety cord and one end of the safety cord is configured to be attached to the rail system and another end of the safety cord has a hook that is configured to be snap-fitted with one of the pair of interface plugs.

* * * * *